United States Patent [19]
Burton

[11] Patent Number: 6,117,316
[45] Date of Patent: Sep. 12, 2000

[54] APPARATUS FOR TREATING WATER

[75] Inventor: Russell Burton, Columbia, Md.

[73] Assignee: Washington Suburban Sanitary, Laurel, Md.

[21] Appl. No.: 09/404,256

[22] Filed: Sep. 22, 1999

Related U.S. Application Data

[60] Provisional application No. 60/101,422, Sep. 22, 1998.
[51] Int. Cl.[7] ................................ C02F 1/58; C02F 1/68; C02F 1/70
[52] U.S. Cl. ............... 210/198.1; 210/749; 210/750; 210/903; 210/757; 422/266; 422/275; 422/276
[58] Field of Search ................. 210/198.1, 749, 210/750, 903, 757; 422/266, 275, 276

[56] References Cited

U.S. PATENT DOCUMENTS

| | | |
|---|---|---|
| 3,710,944 | 1/1973 | Budeshein . |
| 4,364,835 | 12/1982 | Cheh . |
| 4,666,610 | 5/1987 | Kuhns . |
| 4,816,177 | 3/1989 | Nelson et al. . |
| 5,069,073 | 12/1991 | Barrett . |
| 5,082,573 | 1/1992 | Goldstein et al. . |
| 5,207,896 | 5/1993 | Graves . |
| 5,264,120 | 11/1993 | Graves . |
| 5,306,425 | 4/1994 | Graves . |
| 5,350,512 | 9/1994 | Tang . |
| 5,384,102 | 1/1995 | Ferguson . |
| 5,395,625 | 3/1995 | Tang . |
| 5,405,540 | 4/1995 | Tang . |
| 5,427,748 | 6/1995 | Wiedrich et al. . |
| 5,556,279 | 9/1996 | Wolf et al. . |
| 5,567,322 | 10/1996 | Rundle et al. . |
| 5,595,659 | 1/1997 | Huang et al. . |
| 5,674,391 | 10/1997 | Nohren, Jr. . |

*Primary Examiner*—Thomas M. Lithgow
*Attorney, Agent, or Firm*—Millen, White, Zelano & Branigan

[57] ABSTRACT

An apparatus for treating a stream of tap water flowing from the outlet of a fire hydrant comprises a T-shaped diffuser is combination with a frame having a pair of screens extending transverse with respect to outlets of the diffuser. A mesh bag containing a material in tablet form in mounted on each screen. In a preferred aspect of the disclosure, the material is sodium sulfite for interacting with chlorine in the tap water and converting the chlorine to a salt harmless to aquatic life.

15 Claims, 3 Drawing Sheets

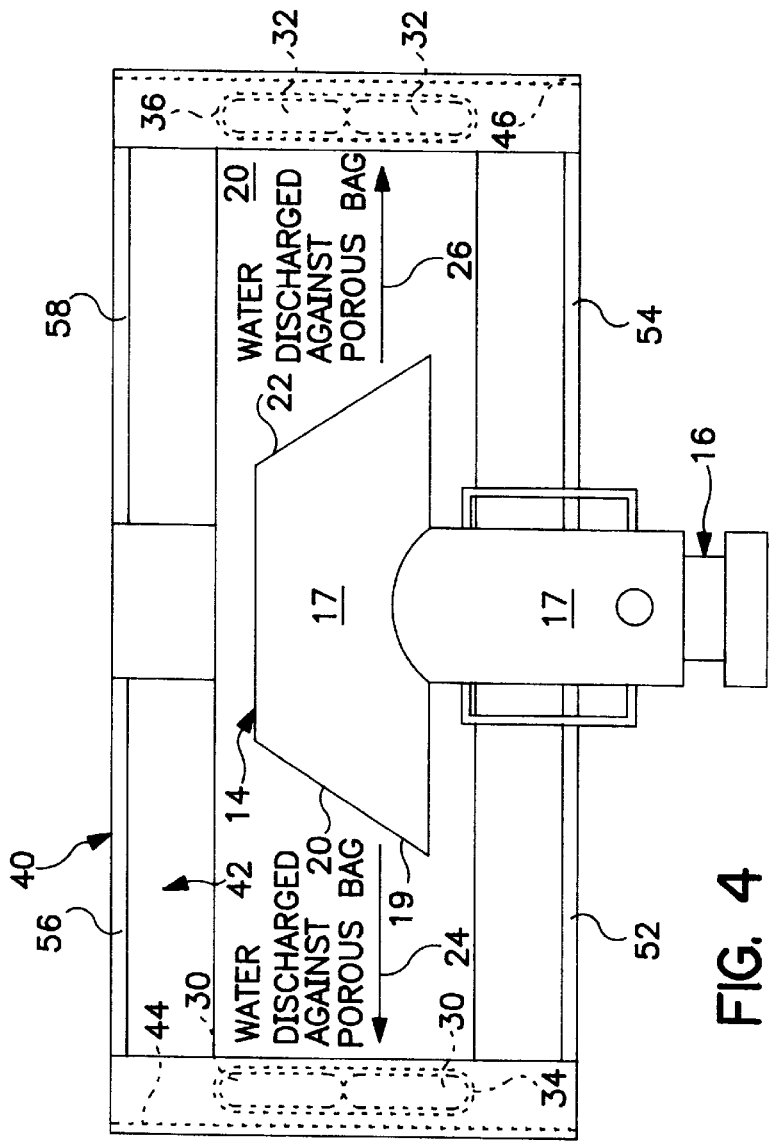
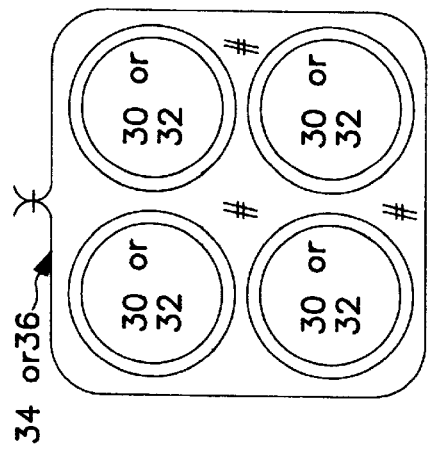
FIG. 4
FIG. 3

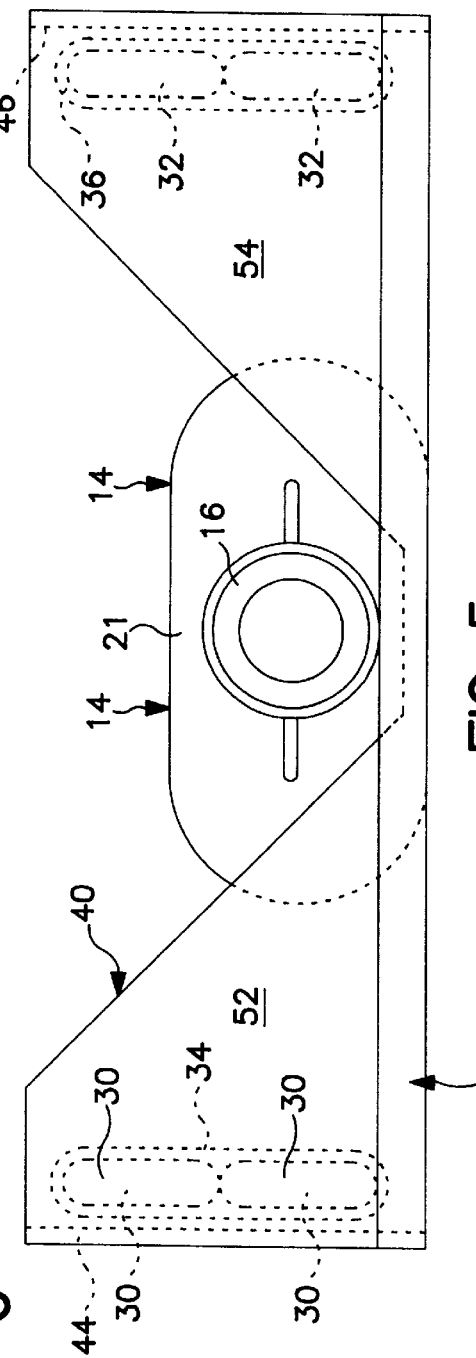
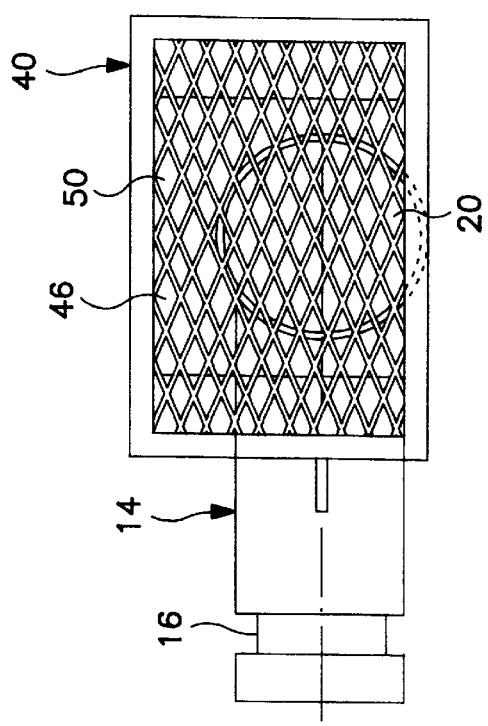
FIG. 5
FIG. 6

APPARATUS FOR TREATING WATER

RELATED APPLICATIONS

This application relates to provisional patent application Ser. No. 60/101,422 filed Sep. 22, 1998.

FIELD OF THE INVENTION

The present invention is directed to an apparatus for treating water, wherein the apparatus is attached to a fire hydrant outlet. More particularly, the present invention is directed to a water treating device, such as a dechlorinating device, for systems delivering potable tap water.

BACKGROUND OF THE INVENTION

From time to time, it is necessary to flush water systems which deliver potable tap water. This is especially the case with newly lined fresh water mains which have been repaired by lining interior surfaces of the mains with a resin material. Before water passing through a pipe which is used for drinking water purposes, it is necessary to thoroughly flush the mains with tap water. In order to maintain water quality, it is also necessary, from time to time, to flush local tap water delivery systems such as neighborhood and subdivision tap water systems.

Generally, discharges from potable water systems result from overflow, flushing, disinfection, hydrostatic testing, mechanical cleaning or dewatering of vessels or structures used to store or convey potable water. This frequently includes fire hydrant flushing in which high velocity streams are generated on the order of 2,000 gallons per minute for a period of 10–15 minutes. By periodically testing fire hydrants, it can be determined if sufficient water is available in the system for fire fighting purposes.

Potable tap water usually contains residual chlorine. The Federal Clean Water Act and state agency regulations regarding discharges of potable water, such as regulations promulgated by the Maryland Department of the Environment, require that total maximum daily amount of residual chlorine must be less than 0.1 mg/liter. At levels higher than 0.1 mg/liter, aquatic life is endangered and fish kills occur. Since potable tap water and water discharged from fire hydrants which originates with county and municipal water systems is necessarily initially chlorinated, heavy discharges of this water will adversely affect aquatic life unless the amount of residual chlorine is reduced to less than 0.1 mg/liter. In the past, this was either not done or, when done, was attempted by injecting sodium sulfite into the discharge stream. This is a difficult process to perform and monitor because it is necessary to dispense sodium sulfite in controlled amounts according to the volume of water being treated. If there is too much sodium sulfite, it can itself cause pollution problems by interfering with ph levels and if the amount is insufficient, there will be excessive residual chlorine. It has been found that the injection approach requires not only highly skilled personnel, but extensive training. Moreover, the end result is unpredictable.

SUMMARY OF THE INVENTION

In view of the aforementioned considerations, it is a feature of the invention to provide a new and improved apparatus for treating a water stream emerging from a water hydrant.

In view of these features and other features, the present invention is directed to an apparatus for treating water flowing from an outlet of a water hydrant, wherein the apparatus comprises a T-shaped water stream diffuser having an inlet connected to the water hydrant and a pair of oppositely directed outlets having a selected extent for directing water streams laterally of the inlet and a frame having a base of a length greater than the selected extent of the laterally directed outlets. The frame has a pair of screens disposed on the base at orientations transverse to the base and at locations spaced by a distance greater than the selected extent of the lateral oulets, wherein the water passing out of the outlets is directed toward the screens and the screens are adapted to support treatment material for treating the water as the water passes the screens.

In a further aspect of the invention, the treatment material is retained in bags which are attached to the screens.

In still another aspect of the invention, the treatment material is a material which removes chlorine from the streams and in a further aspect of the treatment material is sodium sulfite in tablet form.

BRIEF DESCRIPTION OF THE DRAWINGS

Various other features and attendant advantages of the present invention will be more fully appreciated as the same becomes better understood when considered in conjunction with the accompanying drawings, in which like reference-characters designate the same or similar parts through the several views, and wherein:

FIG. 3 is a front face view of sodium sulfite tablets contained in a nylon mesh bag which is liquid pervious;

FIG. 4 is a top view of the water dechlorinating apparatus of FIGS. 1 and 2;

FIG. 5 is an end view of the apparatus of FIGS. 1, 2 and 4; and

FIG. 6 is a side view of the apparatus of FIGS. 1, 2, 4 and 5.

DETAILED DESCRIPTION

Figure 1:
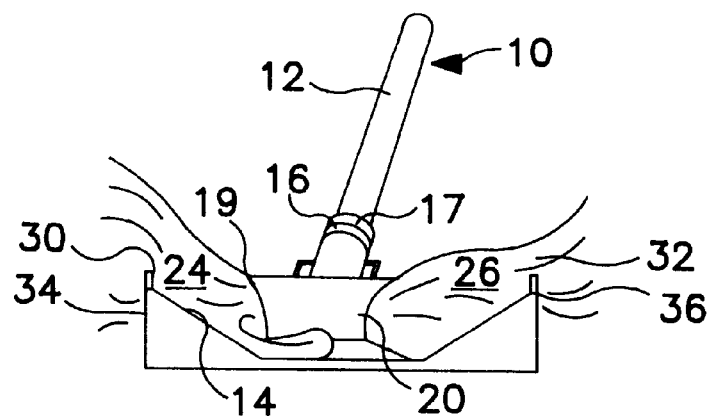
FIG. 1 is a perspective view of a water dechlorination apparatus in accordance with the present invention showing the apparatus in operation.
Figure 2:
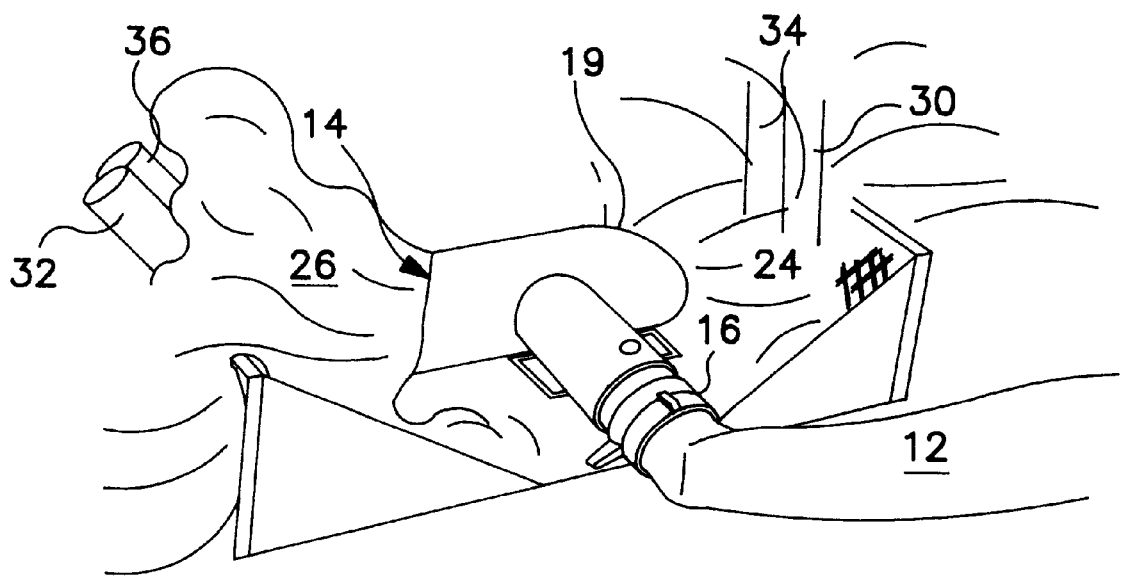
FIG. 2 is a top perspective view of the dechlorination apparatus of FIG. 1.

Referring now to FIGS. 1 and 2, there is shown a fire hydrant 10 connected by a length of fire hydrant hose 12 to a T-shaped diffuser 14 by a coupling 16 forming an inlet 17 of the diffuser. Water flowing from the hydrant 10 down the hose 12 is diffused by the diffuser 14 to flow perpendicular to the hose 12 and the direction of extent of the coupling 16. The diffuser 14 is a T-shaped water stream diffuser similar in configuration to that of U.S. Pat. No. 5,069,073, incorporated herein by reference, which also has an inlet 17 and lateral exhaust openings 19 and 20 in a transverse pipe section 21 having a length of a selected extent. A suitable diffuser 14 is the "Hose Monster" available from Hydro Flow Products, Inc., of Rolling Meadows, Ill. 60008. Diffuser 14 breaks the force of water flowing from the hydrant 10 and directs the water in two streams 24, 26 against sodium sulfite tablets 30, 32 contained within in liquid pervious bags, preferably in the form of NYLON® mesh bags 34 and 36, respectively (see FIG. 3). The sodium sulfite tablets 30,32 remove residual chlorine in the lateral streams 24 and 26 of water being discharged from the diffuser 14. The sodium sulfite tablets 30, 32 are preferably D-CHLOR™ tablets obtainable from Exceltec International Corporation of Sugar Land, Tex. used four to a bag.

Referring now mainly to FIGS. 3–5, in order to support the diffuser 14, the diffuser rests within frame 40 configured in accordance with the principles of the present invention. The frame 40 includes a rectangular base 42 which supports end screens 44, 46 that extend vertically from the rectangular base 42. The end screens 44, 46 are preferably made of expanded aluminum so as to provide voids 50 through which the tap water passes after having been treated by the sodium sulfite tablets 30, 32, which are suspended on the screens 44, 46 by the NYLON® mesh bags 34, 36. The rectangular screens 44, 46 are supported by triangular rear flanges 52, 54 which are welded or otherwise secured to the rectangular frame 40. The rear flanges 52, 54 are supplemented by front flanges 56, 58 on the front of the frame 46 so that the frame is rigid and can withstand the force of the lateral water streams 24, 26. The rear set of triangular flanges 52, 54 define a groove 60 therein which receives the inlet 17 of the diffuser 14.

The NYLON® mesh bags 34, 36 containing the tablets 30, 32 are tied, clamped or otherwise secured to the screens 44, 46 and are replaced when the tablets 30, 32 of sodium sulfite have dissipated or dissolved in the water streams 24 and 26. Preferably, the bags 34,36 are mounted on the inside surfaces of the screens 44,46 so that the impinging streams of water 24 and 26 press the bags against the screens. By the aforedescribed arrangement, free chlorine and other chlorine in the streams 24, 26 is converted into harmless calcium chloride before entering streams, rivers or bays and thus the tap water from the hydrant 10 does not pose a threat to aquatic life.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not imitative of the remainder of the disclosure in any way whatsoever.

I claim:

1. An apparatus for treating water flowing from an outlet of a water hydrant, the apparatus comprising:
   a T-shaped water stream diffuser having an inlet connected to the water hydrant and a pair of oppositely directed outlets having a selected extend for directing water streams laterally of the inlet;
   a frame having a base of a length greater than the selected extent of the laterally directed outlets; and
   a pair of screens disposed on the base at orientations transverse to the base and at locaitons spaced by a distance greater than the selected extent of the lateral outlets wherein the water passing out of the outlets is directed toward the screens, the screens being adapted to support treatment material for treating the water as the water passes the screens.

2. The apparatus of claim 1, wherein the screens have the treatment material mounted thereon in mesh bags.

3. The apparatus of claim 1, wherein the material is in tablet form.

4. The apparatus of claim 2, wherein the material is in tablet form and interacts with chlorine to remove chlorine ions from the streams so as to convert chlorine in the streams into a salt which is harmless to aquatic life.

5. The apparatus of claim 4, wherein material is sodium sulfite and the bags are configured of nylon mesh.

6. An apparatus for treating tap water flowing from an outlet of a water hydrant wherein the tap water is likely to include chlorine, the apparatus comprising:
   a T-shaped water stream diffuser having an inlet connected to the water hydrant and a pair of oppositely directed outlets having a selected extend for directing water streams laterally of the inlet;
   a frame having a base of a length greater than the selected extent of the laterally directed outlets;
   a pair of screens disposed on the base at orientations transverse to the base and at locaitons spaced by a distance greater than the selected extent of the lateral outlets wherein the water passing out of the lateral outlets is directed toward the screens, and
   at least one liquid pervious container secured to each screen, the liquid pervious containers containing a material which interacts with chlorine in the tap water to convert the chlorine to a salt, which salt is harmless to aquatic life.

7. The apparatus of claim 6, wherein the liquid pervious containers are mesh bags.

8. The apparatus of claim 7, wherein the material is in tablet form.

9. The apparatus of claim 8, wherein the material is sodium sulfate.

10. The apparatus of claim 6, wherein the diffuser is connected to the water hydrant by a length of hose.

11. An apparatus for treating water flowing from an outlet of a water hydrant through a T-shaped water stream diffuser having an inlet connected to the water hydrant and a pair of oppositely directed outlets having a selected extend for directing water streams laterally of the inlet; the apparatus comprising:
   a frame having a base of a length greater than the selected extent of the laterally directed outlets; and
   a pair of screens disposed on the base at orientations transverse to the base and at locaitons spaced by a distance greater than the selected extent of the lateral outlets wherein the water passing out of the outlets is directed toward the screens, the screens being adapted to support treatment material for treating the water as the water passes the screens.

12. The apparatus of claim 11, wherein the screens have the treatment material mounted thereon in mesh bags.

13. The apparatus of claim 11, wherein the material is in tablet form.

14. The apparatus of claim 2, wherein the material is in tablet form and interacts with chlorine to remove chlorine ions from the streams so as to convert chlorine in the streams into a salt which is harmless to aquatic life.

15. The apparatus of claim 14, wherein material is sodium sulfite and the bags are configured of nylon mesh.

* * * * *